United States Patent
Gartner

[11] 3,909,402
[45] Sept. 30, 1975

[54] WATER PURIFICATION DEVICE

[75] Inventor: William Joseph Gartner, Bartlett, Ill.

[73] Assignee: Gartner Research & Development Co., Bartlett, Ill.

[22] Filed: Apr. 13, 1972

[21] Appl. No.: 243,644

[52] U.S. Cl. .................................. 210/27; 210/266
[51] Int. Cl.² ......................................... B01D 15/00
[58] Field of Search ......... 210/27, 266, 282, 39, 40, 210/37, 289, 291, 292, 293, 488, 446

[56] References Cited
UNITED STATES PATENTS

| | | | |
|---|---|---|---|
| 2,582,388 | 1/1952 | Mansfield | 210/266 |
| 2,772,002 | 11/1956 | Mauro | 210/DIG. 6 |
| 3,169,112 | 2/1965 | Nelson | 210/289 |
| 3,327,859 | 6/1967 | Pall | 210/266 |
| 3,389,803 | 6/1968 | Barley | 210/266 |
| 3,439,809 | 4/1968 | McPherren | 210/282 |
| 3,529,726 | 9/1969 | Keenan | 210/266 |

Primary Examiner—Thomas G. Wyse
Assistant Examiner—Benoit Castel

[57] ABSTRACT

A water purifier is provided comprising a vertically disposed, elongated vessel containing a granular adsorbent and having retention means therefor at opposite ends thereof. Inlet and outlet conduits are arranged to provide upward flow of water through the adsorbent and the retention means at the upper end is a fine filter, having sufficient resistance to flow so that a back pressure from about 5 to about 20 psi prevails in the vessel when water at ambient temperature is passed through the vessel at a rate of 5 gallons per hour per square inch of said upper end retention means. Preferably, the lower end retention means is also a fine filter providing at least equivalent resistance to flow.

9 Claims, 2 Drawing Figures

WATER PURIFICATION DEVICE

This invention relates to water purification and in particular to a water purification system utilizing an adsorbent for impurities and providing an exceptionally long useful life for the adsorbent.

It is known that water containing small amounts of impurities can be purified by passage through an adsorbent. For gaseous impurities, odor-bearing impurities and color-bearing impurities, the adsorbent material generally used in activated carbon in granular form. For mineral impurities, the adsorbent selected is generally an ion exchange resin.

One problem with adsorbent systems for water purification is the relatively short, useful life of the adsorbent before it ceases to function effectively. The adsorbent in water purification systems is usually provided in replaceable cartridges, and the relatively short life of the adsorbent requires frequent cartridge replacement.

In accordance with this invention, the useful life of water purification adsorbents is extended by providing a flow system which eliminates channeling within the adsorbent and by providing adsorption under elevated pressure conditions. Specifically, a system is provided in which the water to be purified flows through a vertically disposed, elongated adsorbent-containing cartridge in an upward direction and is forced through the cartridge against the back pressure of a fine filter downstream of the adsorbent to provide a pressure within the adsorbent chamber between about 5 and about 20 psig.

BRIEF DESCRIPTION OF THE DRAWINGS

The invention is best understood by reference to the drawings of which.

DETAILED DESCRIPTION OF THE INVENTION

Figure 1:
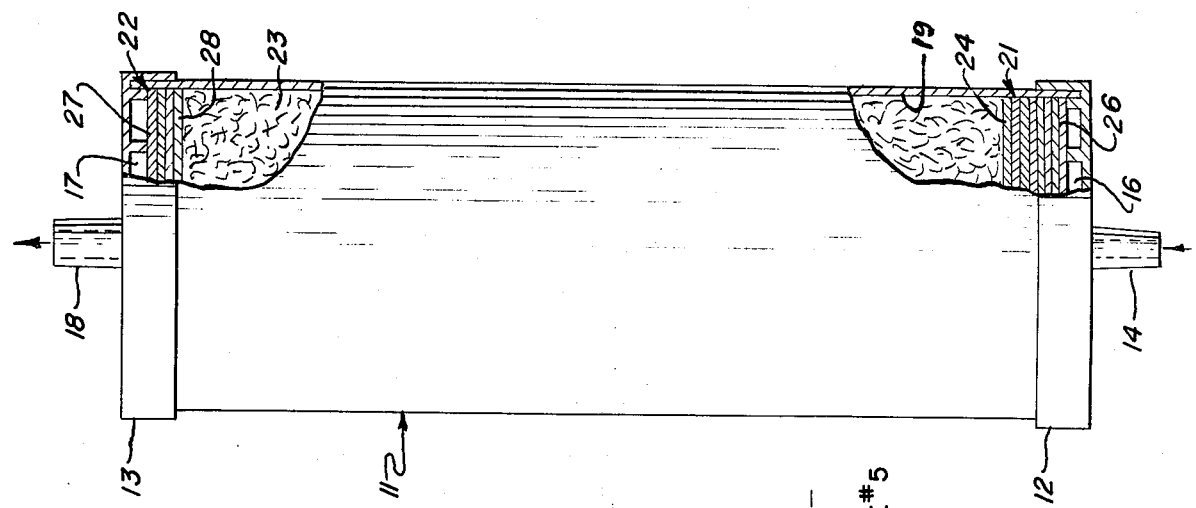
FIG. 1 shows the purification device in vertical elevation and partly in section.

The water purification device comprises cartridge 11 having press fitted end cap 12 at its lower end and fitted end cap 13 at its upper end. End cap 12 includes inlet 14 and diffusion space 16. End cap 13 includes collection space 17 and outlet 18.

Cartridge 11 comprises cylindrical side wall 19, sealed at its lower end by filter pack 21 and at its upper end by filter pack 22, and filled with granular adsorbent 23. The granular adsorbent preferably comprises activated carbon for the purification of waters containing gases, or materials causing odors or colors. The granular material is preferably an ion exchange resin, or a mixture of cationic and anionic exchange resins, for the demineralization of water. If it is desired to remove both odor- or color-forming materials and minerals, the granular material may comprise one or more layers of activated carbon followed by one or more layers of ion exchange resins followed by a final layer of activated carbon.

The minimal function of filter pack 21 is to diffuse incoming water across the entire cross-sectional area of the cartridge and to retain the granular adsorbent in place. Preferably, however, filter pack 21 is a filter of high flow resistance and very fine pore size so that very small particles, and particularly iron particles, do not get into the adsorbent. In a preferred embodiment, it comprises a plurality of coarse filter layers 24 on the upstream side of the filter pack and a plurality of fine filter layers 26 on the downstream side. If desired, filter layers of intermediate density may be interposed between the coarse and fine filter layers.

Filter pack 22 also serves to retain the granular adsorbent in place. But in accordance with this invention it is designed to provide sufficient resistance to water flow to develop a desired back pressure within the cartridge. Filter pack 22 comprises a series of fine filter layers 27, preferably preceded by a series of coarse filter layers 28. Filter pack 22 may also, if desired, contain filter layers of intermediate density between the fine and coarse filter layers. The combined resistance of filter pack 22 is such that there is a back pressure between about 5 and about 20 pounds per square inch gauge when the flow of water at ambient temperatures is adjusted to 5 gallons per square inch of cartridge cross section or of the area of filter pack 22.

In a specific construction for the purification of tap water with the removal of bad taste and odors therefrom, the cartridge is 7 inches long and 2¼ inches in inside diameter and is filled with granular activated carbon. Filter pack 22 comprises (in order in the direction of water flow) two sheets of coarse filter and two sheets of fine filter paper. The fine filter paper has a thickness of 0.10 inches, a weight of 144 pounds per 1000 square feet, and a rate of water flow therethrough at ambient temperatures (for a single sheet) of 340 gallons per minute per square foot at a pressure drop of 20 pounds per square inch. The coarse filter paper has a thickness of 0.38 inches, a weight of 50 pounds per 1000 square foot and a rate of water flow therethrough at ambient temperatures (for a single sheet) of 1440 gallons per minute per square foot at a pressure drop of 20 pounds per square inch.

Filter pack 21, in the preferred embodiment of this construction, is also a fine filter and provides at least as much flow resistance as filter pack 22. In the specific embodiment, it comprises four sheets each of the fine and coarse filter papers described above, the coarse papers being upstream of the fine papers.

In use, the purification device is placed in upright position near a source of tap water which is controllable with respect to pressure and rate of flow. The tap water source is connected to the inlet by a connection capable of withstanding moderate pressures; and the outlet of the device is arranged to lead to a receptacle for the purified water. Water flow through the device is then started and adjusted to a rate of about 12 to about 20 gallons per hour, or from about 3 to about 5 gallons per hour per square inch of area of filter pack 22. The device, with an activated carbon cartridge, is capable of operating under these conditions to purify hundreds of gallons of water with only minor adjustments at the water source to keep the water flow relatively constant as the filters slowly clog and build up more flow resistance.

Although the flow rate for testing the resistance of filter pack 22 is selected at 5 gallons per hour per square inch of filter, the flow rate need not be maintained at precisely this level in actual operation. The optimum range is from about 3 to about 5 gallons per hour per square inch of filter; and acceptable results are obtained at flow rates from about 1 to about 10 gallons per hour per square inch of filter.

An important feature of this invention is the provision for vertical upward flow through the adsorbent cartridge. Such flow assures complete filling of the cartridge by the flowing water and contact of the water with all portions of the adsorbent. This is in contrast to vertical downward flow and to horizontal flow where air remains in the cartridge and there is a tendency for the water to flow in channels, leaving portions of the adsorbent untouched, or relatively untouched.

Another important feature of this invention is the provision for a filter at the outlet end of the cartridge which provides sufficient resistance to water flow to develop back pressure in the cartridge in the desired range when the flow through the cartridge is adjusted to about 5 gallons per hour per square inch of outlet filter or per square inch of cartridge cross section. It has been found that such back pressure results in substantial extension of the useful life of the adsorbent. It has also been found that resistance to flow in the inlet filter does not extend adsorbent life when utilized alone but does extend adsorbent life when utilized in combination with a resistance filter at the outlet end.

To illustrate these factors a series of tests were run on various cartridge arrangements in which the useful life of an activated carbon adsorbent was determined for the adsorption of chlorine. In these tests, water containing 0.5 ppm of chlorine was continuously run through each of the cartridges tested at a rate of 20 gallons per hour; and the chlorine content of the effluent was periodically tested until it showed a value in excess of 0.15 ppm, at which time the cartridge was considered to be spent.

In test No. 1, a commercially available water purification system was used comprising an elongated, horizontally disposed cartridge containing 0.62 pounds of activated carbon and having at each end filter pads of loose construction to hold the carbon in place while providing little or no resistance to water flow.

In test No. 2, the vertically disposed, upward flowing system of this invention was used, utilizing a cartridge having 0.44 pounds of activated carbon and having at each end the same loosely constructed filter pads of test No. 1.

In test No. 3, the system was the same as that of test No. 2, except that the loosely constructed filter pad at the inlet end was replaced by a filter system of higher flow resistance, namely, the system described above utilizing four sheets each of the fine and coarse filter paper.

In test No. 4, the system was the same as that of test No. 2, except that the loosely constructed filter pad at the outlet end was replaced by a filter system of higher flow resistance, namely, the system described above utilizing two sheets each of the fine and coarse filter papers.

In test No. 5, the system was the same as that of test No. 2, except that the loosely constructed filter pads at both ends were replaced by filter systems of higher flow resistance, as in tests No. 3 and No. 4.

Figure 2:
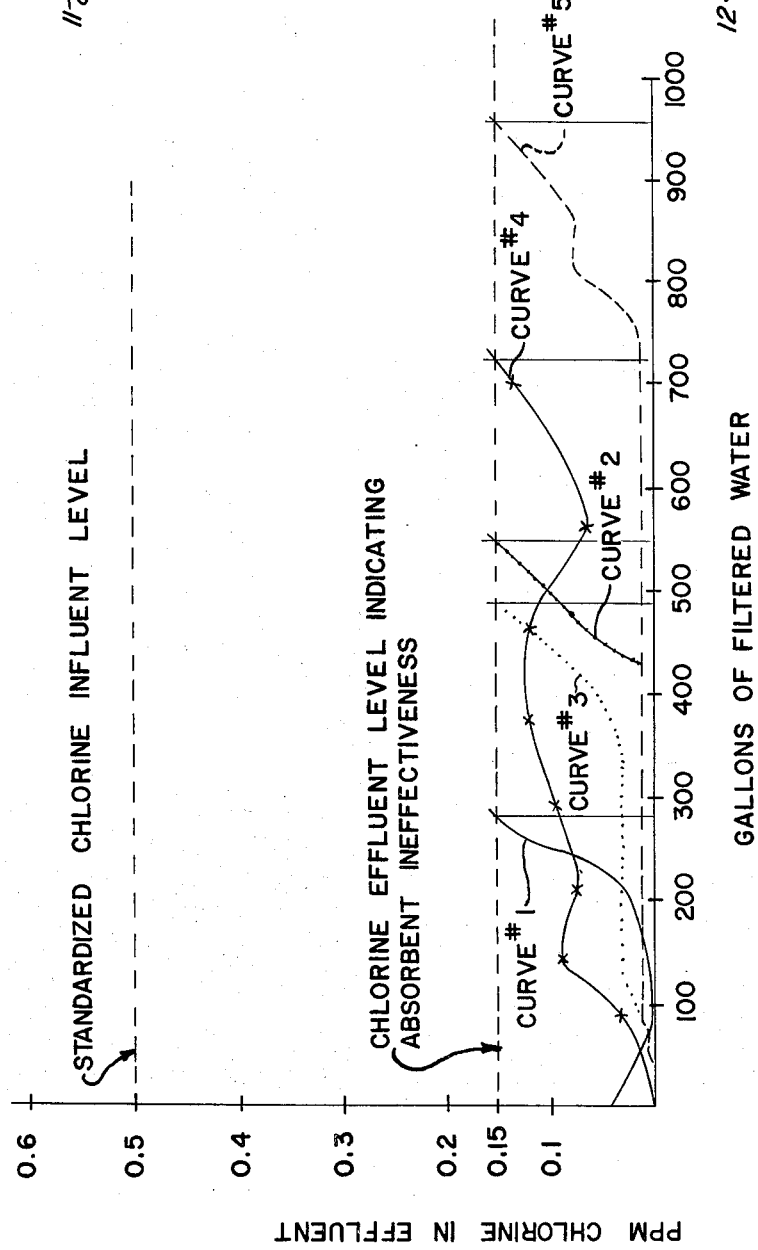
FIG. 2 is a graph showing the adsorptive capacity of the purification device of this invention in comparison to other systems.

In FIG. 2, the results of the tests are plotted showing the amount of chlorine in each effluent against the cumulative gallons of effluent that have flowed through the cartridge.

A comparison of the results of tests No. 1 and No. 2 shows the advantage of upward vertical flow of water through the cartridge. In test No. 1 with horizontal flow the effluent concentration of chlorine reaches 0.15 ppm by the time about 280 gallons have passed through the cartridge while test No. 2 with vertical upward vertical flow shows that about 550 gallons of water can be handled before the effluent concentration of chlorine reaches 0.15 ppm. It is to be noted that the cartridge of test No. 2 lasts much longer than that of test No. 1 despite the fact that the latter contains about 40 percent more activated carbon than the former.

Tests Nos. 3, 4 and 5 show the effect of the back pressure exerted by the outlet filter and the effect of the fine inlet filter both with and without the outer filter. Test No. 3 utilizing a fine inlet filter and a loosely constructed outlet filter pad showed an effluent chlorine concentration of 0.15 ppm after only about 490 gallons had passed through the cartridge. When compared with the results of test No. 2, it indicates that a fine filter at the inlet end only does not improve cartridge life and, in fact, results in a shortened effective life of the cartridge.

Test No. 4 with a cartridge having a fine outlet filter and a loosely constructed inlet filter shows that when the adsorption takes place under back pressure conditions the effluent does not reach a chlorine concentration of 0.15 ppm until about 725 gallons of water have passed through the cartridge.

Finally, test No. 5 shows that fine filters at both ends of the cartridge extend its life to about 960 gallons of throughput before the chlorine concentration reaches a level of 0.15 ppm. It is to be noted that there is a synergistic action between the fine filters at the opposite ends of the cartridge in that the fine filter at the inlet end extends the life of a cartridge having a fine filter at the outlet end despite the fact that it shortens the life of a cartridge with a coarse outlet filter.

While the invention has been described with respect to a particular embodiment it will be understood by those skilled in the art that modifications and variations thereof may be utilized without departing from the essence of the invention.

I claim:

1. A water purifier suitable for removing chlorine from water comprising a vertically disposed, elongated vessel having an inlet at the bottom thereof and an outlet at the top thereof, retention means for a granular adsorbent near the inlet of said vessel and near the outlet of said vessel, and a granular adsorbent comprising activated carbon between said respective retention means, said retention means near said outlet comprising a filter element, said filter element having sufficient resistance to the flow of water therethrough so that a back pressure from about 5 to about 20 psi prevails in said vessel when water at ambient temperature is passed outwardly through said outlet retention means at a rate of 5 gallons per hour per square inch of said retention means near said outlet.

2. The water purifier of claim 1 wherein said retention means near said inlet has a resistance to the flow of water therethrough at least as great as that of said retention means near said outlet.

3. The water purifier of claim 2 wherein each of said retention means comprises a plurality of layers of filter paper of at least two degrees of fineness, the coarser filter papers of each retention means being upstream of the finer filter papers thereof.

4. A water purifier cartridge suitable for removing chlorine from water comprising an elongated, open-ended vessel having an inlet end and an outlet end, having retention means for a granular adsorbent near each of said ends and having a granular adsorbent comprising activated carbon between said respective retention means, at least the retention means at said outlet end comprising a filter element, said filter element providing sufficient resistance to water flow therethrough so that a back pressure from about 5 to about 20 psi prevails in said cartridge when water at ambient temperatures is passed outwardly through said last-named retention means at a rate of 5 gallons per hour per square inch of said last-named retention means.

5. The water purifier cartridge of claim 4 wherein each of said retention means comprises a plurality of filter papers of at least two degrees of fineness, one of the retention means having its coarser papers adjacent said granular adsorbent and the other retention means having its finer filter papers adjacent said granular adsorbent.

6. The water purifier cartridge of claim 5 wherein each of said retention means comprises at least two sheets of fine filter paper, each sheet having a rate of water flow therethrough at ambient temperatures of about 340 gallons per minute per square foot at a pressure drop of 20 pounds per square inch.

7. A method of removing chlorine from water which comprises passing said water through a closed system comprising, in order, an inlet filter, a granular adsorbent for water impurities comprising activated carbon and an outlet filter, at a rate of from about 1 to about 10 gallons of water per hour per square inch of outlet filter, said outlet filter having sufficient resistance to the flow of water therethrough so that a back pressure from about 5 to about 20 psi prevails in said granular adsorbent when water at ambient temperatures is passed therethrough at a rate of 5 gallons per hour per square inch of outlet filter area.

8. The method of claim 7 wherein said water is passed through said closed system in a vertical upward direction.

9. The method of claim 8 wherein said water is passed through said closed system at a rate from about 3 to about 5 gallons of water per hour per square inch of outlet filter.

* * * * *